United States Patent [19] [11] 3,921,855
Syverson [45] Nov. 25, 1975

[54] DRINK DISPENSER WITH LEVEL CONTROL FOR SUPPLY TANK

[75] Inventor: Martelle J. Syverson, Albert Lea, Minn.

[73] Assignee: Fountain Industries, Inc., Albert Lea, Minn.

[22] Filed: Jan. 10, 1975

[21] Appl. No.: 540,113

[52] U.S. Cl. ............... 222/67; 73/322; 222/146 HE
[51] Int. Cl.² ......................................... G01F 23/10
[58] Field of Search ...... 137/429, 432; 73/313, 314, 73/319, 322; 222/67, 146 HE

[56] References Cited
UNITED STATES PATENTS

| | | | |
|---|---|---|---|
| 1,656,384 | 1/1928 | Messeny | 222/67 X |
| 2,869,760 | 1/1959 | Karlen et al. | 222/146 HE X |
| 3,181,732 | 5/1965 | Immermann et al. | 222/146 HE X |
| 3,193,144 | 7/1965 | King | 222/67 |
| 3,266,670 | 8/1966 | Brooks et al. | 222/146 HE X |

Primary Examiner—Robert B. Reeves
Assistant Examiner—David A. Scherbel
Attorney, Agent, or Firm—Zarley, McKee, Thomte & Voorhees

[57] ABSTRACT

A water holding tank includes inlet and outlet valves. A float is carried on a rod having an elongated portion extending at its lower end through the bottom wall of the tank and an upper end extending above the upper water level and merges into a return bend portion connected to the float. The bottom end of the rod has a circular disc movable in the path of a switch connected to the inlet water valve. A tube is sealingly connected to the bottom wall of the tank and includes an upper open end extending above the upper water level. The float rod is positioned in the tube to isolate the rod from the water and to allow the float to freely move about the tube and vertically in the tank.

3 Claims, 4 Drawing Figures

DRINK DISPENSER WITH LEVEL CONTROL FOR SUPPLY TANK

BACKGROUND OF THE INVENTION

A drink dispensing machine having a float for controlling the water level is often plagued with problems caused by the water rendering the float inoperative due to corrosion and mineral buildup on the float rod. This invention isolates the float from the water at all points except where the float itself touches the water and thus the float rod is unaffected by the water conditions in the tank.

SUMMARY OF THE INVENTION

The isolation of the float rod from the water is accomplished by providing a tube sealed at its lower end on the bottom of the tank. The tube is open at its upper end and extends above the water level. A float rod having a return bend is positioned with the elongated portion of the rod in the tube and the lower end of the rod extends below the bottom tank wall. The upper end of the elongated portion merges into the return bend portion which carries the float. Thus it is seen the float is free to rotate about an axis through the tube and move vertically within the tube as the water rises and falls in the water tank. A switch is positioned in the path of the rod below the bottom wall of the tank and is actuated by a circular disc on the lower end of the rod such that in any position of rotation the disc is in a position to actuate the switch. The tube is conveniently sealed to the bottom wall by conventional sealing washers and nuts on opposite sides of the bottom wall engaging threads on the tube.

This invention consists in the construction, arrangements and combination of the various parts of the device, whereby the objects contemplated are attained as hereinafter more fully set forth, specifically pointed out in the claims, and illustrated in the accompanying drawings in which:

DESCRIPTION OF THE PREFERRED EMBODIMENT.

Figure 1:
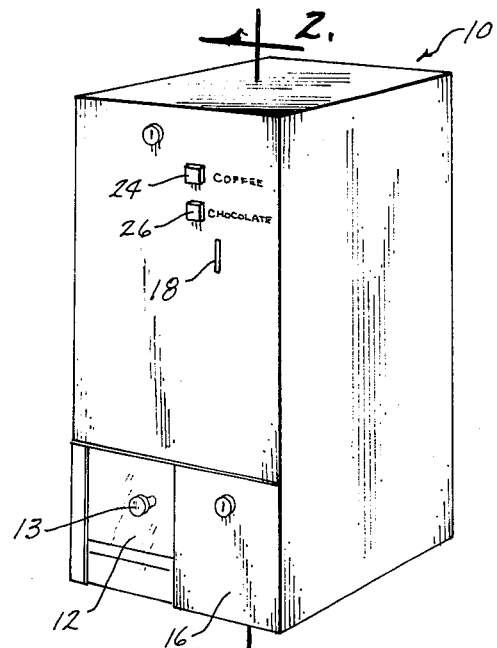
FIG. 1 is a perspective view of the drink dispensing machine.
Figure 2:
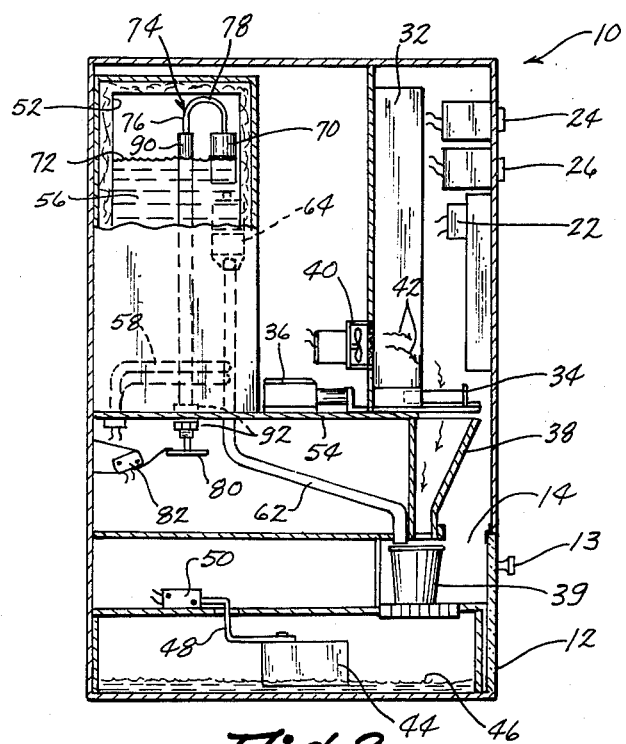
FIG. 2 is a cross sectional view taken along line 2—2 in FIG. 1.
Figure 3:
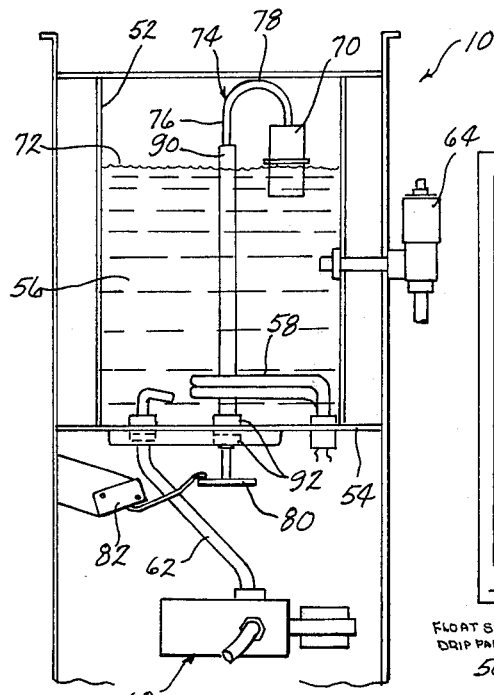
FIG. 3 is a fragmentary cross sectional view of the water tank and float control system.
Figure 4:
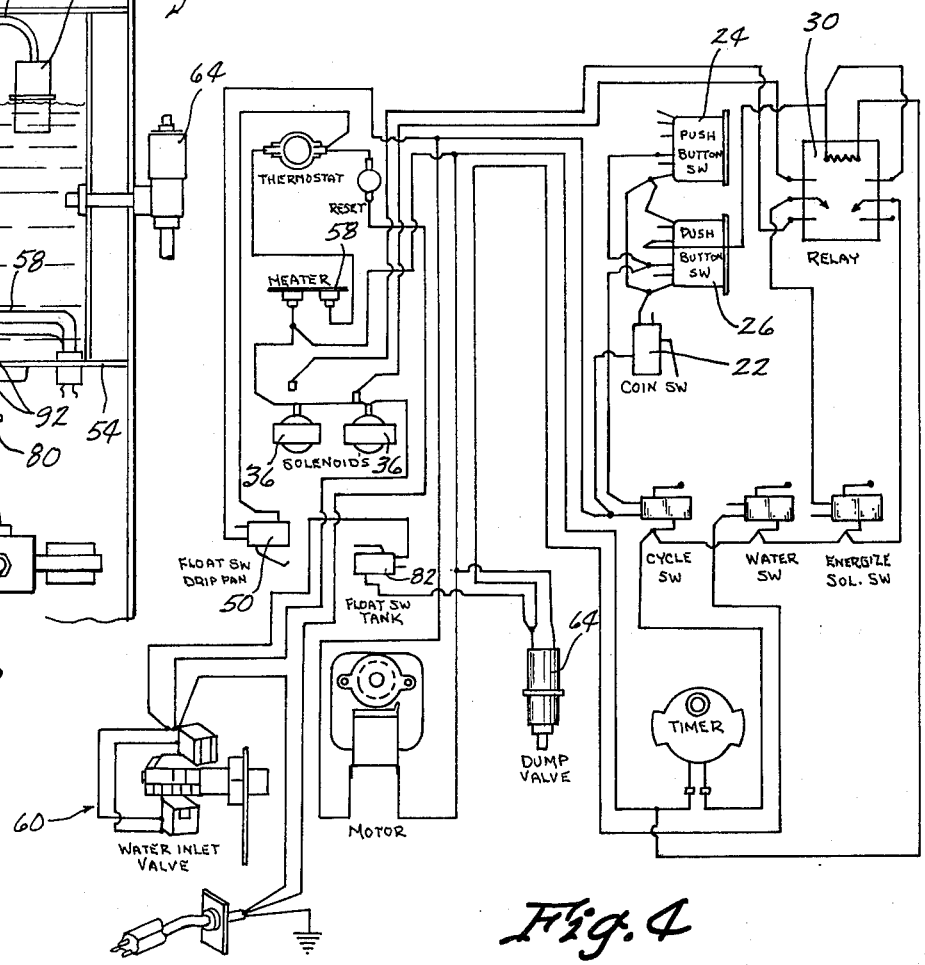
FIG. 4 is an electrical schematic of the vending machine electrical circuitry.

The dispensing machine of this invention is referred to generally in FIG. 1 by the reference numeral 10. A door 12 of transparent plastic material having a handle 13 is provided on the front side for access to a cup filling chamber 14 as seen in FIG. 2. A coin box is provided behind a panel portion 16 on the front side. This system is activated by coins being inserted into the coin opening 18 which are received by the coin mechanism 20 which includes a switch 22. The drink desired is controlled by the switches 24 and 26 on the front of the machine which are activated by the coin switch 22 and in turn activate a relay 30.

Drink concentrate is stored in a cartridge 32 having a metering scoop 34 operated by a solenoid 36. The product is dropped into a funnel 38 positioned over a cup 39.

Humid vapors are evacuated from the interior of the machine and away from the dry food product by a fan 40 as indicated by the arrows 42.

A drip pan float system is provided which includes a float 44 responsive to the rise and fall of liquid 46 below the cup 39. A float rod 48 is connected to a switch 50 for deactivating the system upon the liquid 46 rising above a predetermined level.

The float control system for the water tank will now be described. The dispenser 10 includes a water tank 52 having a bottom wall 54 and holds water 56. A heating element 58 is provided on the bottom wall 54. An inlet valve of the solenoid type 60 is provided in an inlet line 62 which admits water adjacent the bottom wall 54 in response to operation of the float control system. A dump valve 64 upon being actuated allows for discharge of water into the cup 39.

A float control system includes a float 70 on the water upper level surface 72 and is carried on a float rod 74 having an elongated portion 76 and a return bend portion 78. The lower end of the elongated portion 76 extends through the bottom wall 54 of the water tank while the upper end extends above the upper water level and merges into the return bend portion 78 which carries the float 70 on its lower free end. A circular disc 80 is carried on the lower end of the elongated rod portion 76 and moves in the path of a switch 82 regardless of the angular position of the float 70.

The float rod 76 is isolated from the water 56 by a tube 90 having a lower end sealingly connected to the bottom wall 54 of the tank by a pair of nuts 92 threadably engaging the threaded lower end of the tube positioned in the opening through which the rod 76 extends. Conventional sealing washers are employed to complete the seal. The upper end of the tube 90 extends above the upper water level 72 and is open to receive the elongated float rod portion 76. Thus it is seen the float rod 74 is free to pivot or rotate about an axis through the tube 90 as the float 70 moves up and down and about in the water 56 in the tank 52.

Thus in operation it is seen that the discharge of water 72 from the tank 52 through the dump valve 64 causes the float 70 to move downwardly thereby maintaining the switch 82 in its normally closed condition which allows the inlet valve 60 to be actuated for replenishing water through the inlet conduit 62 into the tank 52 at the bottom thereof. Upon the float rising in response to the rising water in the tank the circular disc 80 moves the leaf spring of the switch 82 upwardly and causes the switch 82 to be opened thereby opening the circuit through the inlet solenoid valve 60 thereby terminating the flow of water into the tank.

I claim:

1. A hot drink dispensing machine comprising,
    a water tank having a bottom wall,
    inlet and outlet valve means connected to said tank,
    a float in said tank carried on a rod, said rod having an elongated portion extending from below the tank bottom wall to above the water upper level, said rod including a return bend portion at its upper end and said float being connected to the lower end of said return bend portion,
    a guide tube open at its top end sealingly connected at its lower end to the bottom wall of said tank and the top end extending above the top water level and said elongated portion of said float rod being positioned in said tube for isolating said rod from the water in said tank, and a switch in the path of the lower end of said rod for actuation by said rod as said float moves up and down with the rise and fall of water in said tank and said switch being operatively connected to said inlet valve.

2. The structure of claim 1 wherein said rod is freely rotatable and vertically movable in said tube to allow said float to freely move relative to said tube and said tank in response to water movement in said tank.

3. The structure of claim 2 wherein said elongated rod includes a circular disc on the lower end and said disc is free to turn with said rod as said float and rod move relative to said tube and said disc is positioned to actuate said switch at all angular positions of said float.

* * * * *